(12) United States Patent
Zhou et al.

(10) Patent No.: US 8,233,358 B2
(45) Date of Patent: Jul. 31, 2012

(54) PLASMON ANTENNA WITH MAGNETIC CORE FOR THERMALLY ASSISTED MAGNETIC RECORDING

(75) Inventors: Yuchen Zhou, San Jose, CA (US); Kenichi Takano, Santa Clara, CA (US); Xuhui Jin, Shakopee, MN (US); Erhard Schreck, San Jose, CA (US); Moris Dovek, San Jose, CA (US); Joe Smyth, Aptos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 496 days.

(21) Appl. No.: 12/456,290

(22) Filed: Jun. 15, 2009

(65) Prior Publication Data

US 2010/0315735 A1 Dec. 16, 2010

(51) Int. Cl.
*G11B 11/00* (2006.01)
(52) U.S. Cl. .............. 369/13.33; 369/112.27; 360/59; 360/125.31
(58) Field of Classification Search ............ 369/13.33, 369/13.32, 13.24, 13.14, 13.03, 13.02, 13.12; 369/112.27, 112.09, 112.14; 360/59, 313, 360/245.3, 126, 123.17, 125.31, 125.74, 360/128; 29/603.07
See application file for complete search history.

(56) References Cited

U.S. PATENT DOCUMENTS

| | | | |
|---|---|---|---|
| 6,424,820 B1 | 7/2002 | Burdick et al. | |
| 6,538,617 B2 | 3/2003 | Rochelle | |
| 8,036,069 B1 * | 10/2011 | Jin et al. | 369/13.32 |
| 8,059,496 B1 * | 11/2011 | Zhou et al. | 369/13.33 |
| 2008/0192376 A1 | 8/2008 | Tanaka et al. | |
| 2008/0198496 A1 | 8/2008 | Shimazawa et al. | |
| 2010/0103553 A1 | 4/2010 | Shimazawa et al. | |
| 2011/0181979 A1 * | 7/2011 | Jin et al. | 360/59 |
| 2012/0008229 A1 * | 1/2012 | Zhou et al. | 360/59 |
| 2012/0020194 A1 * | 1/2012 | Jin et al. | 369/13.13 |

* cited by examiner

*Primary Examiner* — Ali Neyzari
(74) *Attorney, Agent, or Firm* — Saile Ackerman LLC; Stephen B. Ackerman

(57) ABSTRACT

A TAMR (Thermal Assisted Magnetic Recording) write head uses the energy of optical-laser generated plasmons in a plasmon antenna to locally heat a magnetic recording medium and reduce its coercivity and magnetic anisotropy. To enable the TAMR head to operate most effectively, the maximum gradient of the magnetic recording field should be concentrated in the small region being heated. Typically this does not occur because the spot being heated by the antenna is offset from the position at which the magnetic pole concentrates its magnetic field. The present invention incorporates a magnetic core within a plasmon antenna, so the antenna effectively becomes an extension of the magnetic pole and produces a magnetic field whose maximum gradient overlaps the region being heated by edge plasmons being generated in a conducting layer surrounding the antenna's magnetic core.

25 Claims, 9 Drawing Sheets

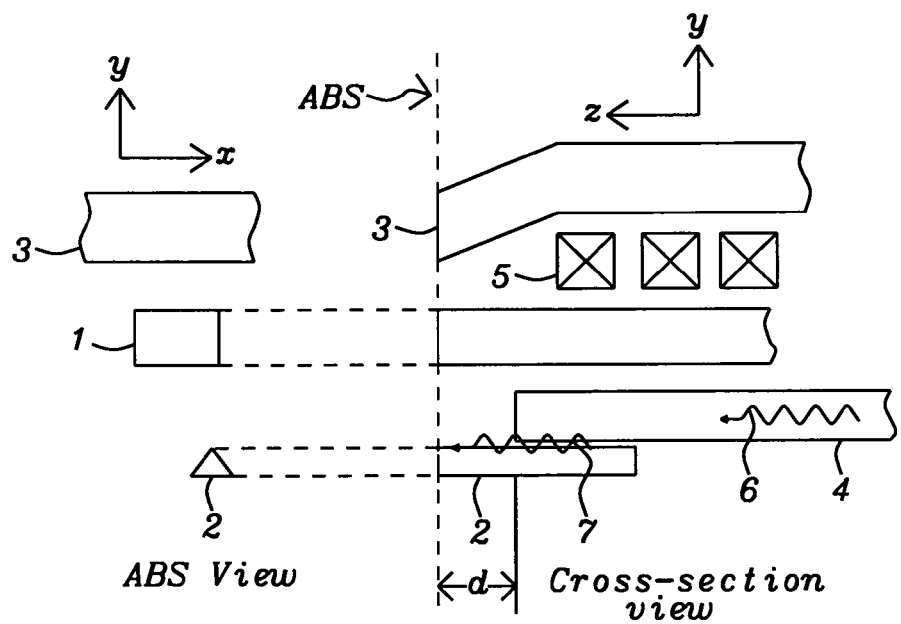
FIG. 1 - Prior Art
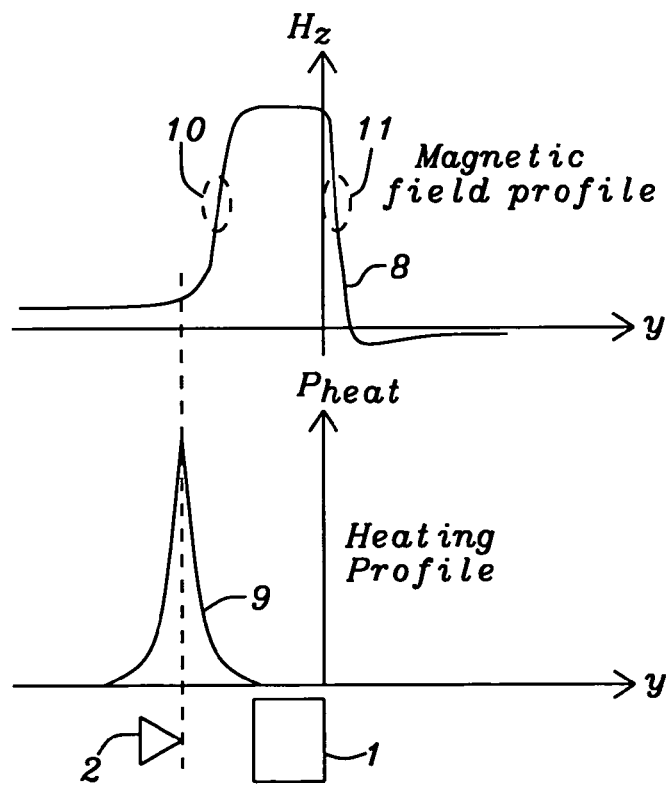
FIG. 2 - Prior Art

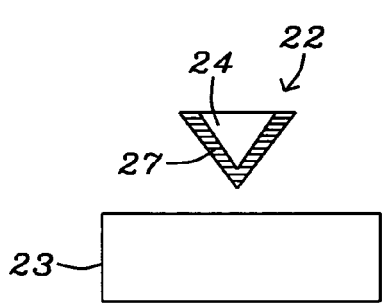
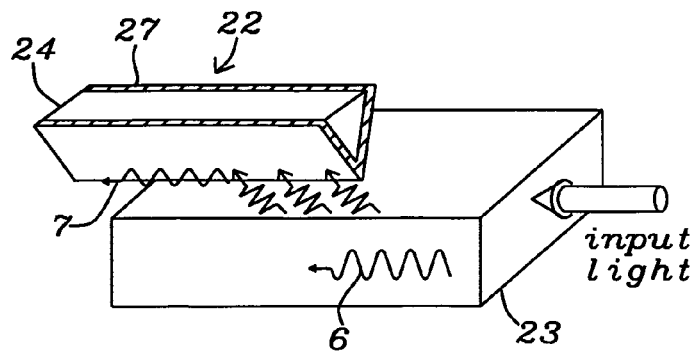
FIG. 3a   FIG. 3b
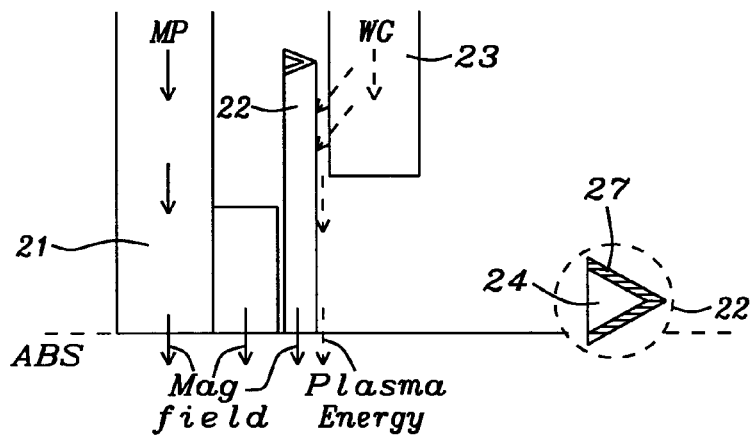
Magnetic core antenna (MCA)
FIG. 4
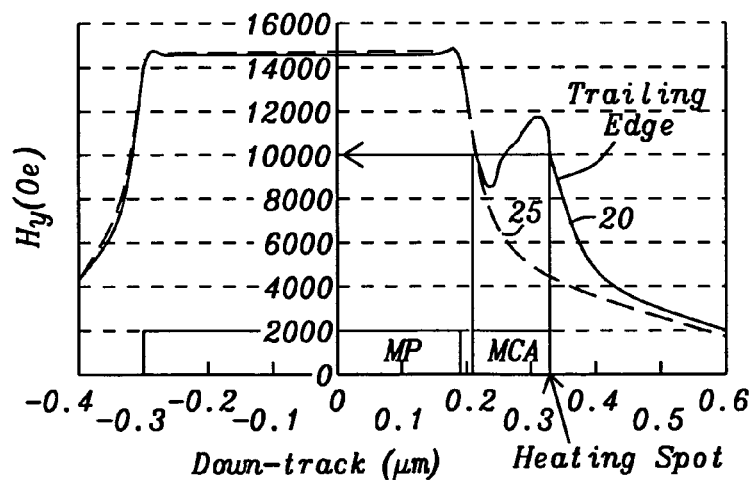
FIG. 5

| Antenna type | Core | Coupling efficiency into antenna | Coupling efficiency into medium |
|---|---|---|---|
| Ag antenna | Ag | 44.2% | 3.9% |
| Non-metal core | Al2O3 | 29.5% | 1.3% |
| Mag. Core (Non-optimized) | NiFe | 32.8% | 2.9% |

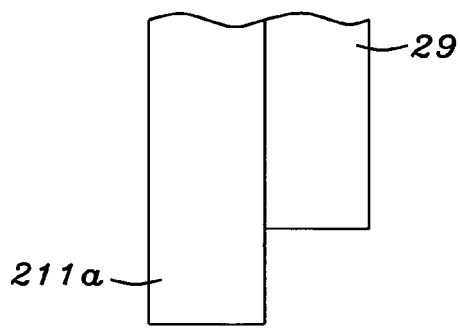
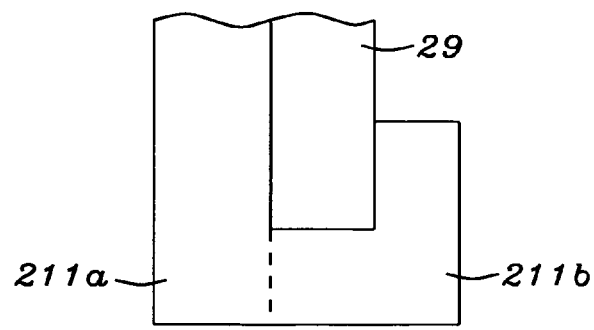
FIG. 10c    FIG. 10d
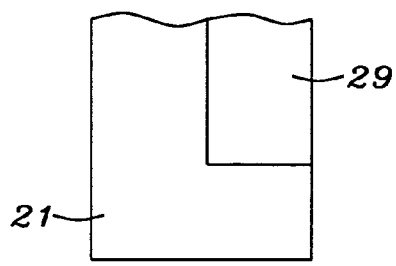
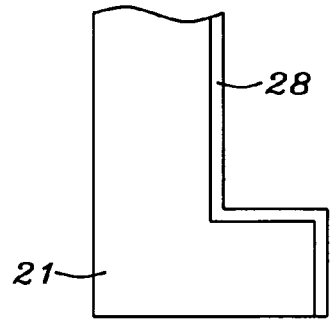
FIG. 10e    FIG. 10f
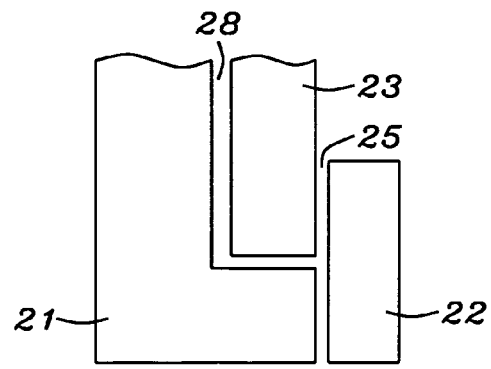
FIG. 10g

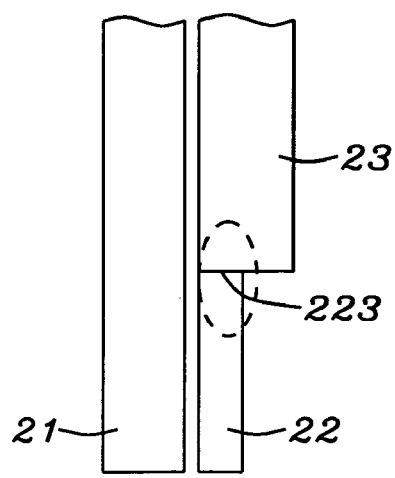
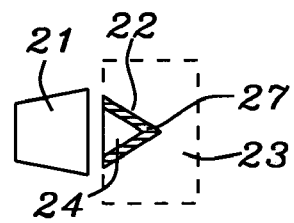
FIG. 11a    FIG. 11b
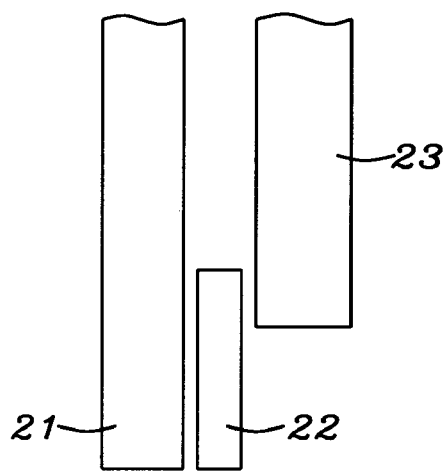
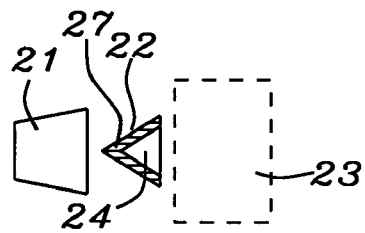
FIG. 12a    FIG. 12b
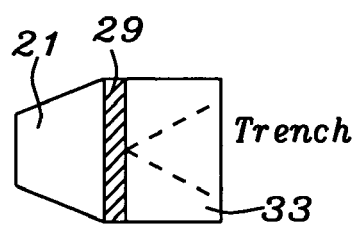
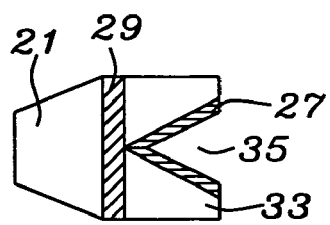
FIG. 12c    FIG. 12d

PLASMON ANTENNA WITH MAGNETIC CORE FOR THERMALLY ASSISTED MAGNETIC RECORDING

BACKGROUND OF THE INVENTION

1. Field of the Invention

This invention relates to the fabrication of magnetic read/write heads that employ TAMR (thermally assisted magnetic recording) to enable writing on magnetic media having high coercivity and high magnetic anisotropy. More particularly, it relates to the use of a plasmon antenna (PA) to transfer the required thermal energy from the read/write head to the media.

2. Description of the Related Art

Magnetic recording at area data densities of between 1 and 10 Tera-bits per $in^2$ (Tbpsi) involves the development of new magnetic recording mediums, new magnetic recording heads and, most importantly, a new magnetic recording scheme that can delay the onset of the so-called "superparamagnetic" effect. This effect is the thermal instability of the extremely small regions on which information must be recorded, in order to achieve the required data densities. A way of circumventing this thermal instability is to use magnetic recording mediums with high magnetic anisotropy and high coercivity that can still be written upon by the increasingly small write heads required for producing the high data density. This way of addressing the problem produces two conflicting requirements: 1. the need for a stronger writing field that is necessitated by the highly anisotropic and coercive magnetic mediums and; 2. the need for a smaller write head of sufficient definition to produce the high areal write densities, which write heads, disadvantageously, produce a smaller field gradient and broader field profile. Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

The prior art forms of assisted-recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field. These prior art assisted-recording methods either involve deep sub-micron localized heating by an optical beam or ultra-high frequency AC magnetic field generation.

The heating effect of TAMR works by raising the temperature of a small region of the magnetic medium to essentially its Curie temperature ($T_C$), at which temperature both its coercivity and anisotropy are significantly reduced and magnetic writing becomes easier to produce within that region. In the following, we will address our attention to a particular implementation of TAMR, namely the transfer of electromagnetic energy to a small, sub-micron sized region of a magnetic medium through interaction with the near field of an edge plasmon excited by an optical frequency laser. The edge plasmon is excited in a small conducting plasmon antenna (PA) approximately 200 nm in width that is incorporated within the read/write head structure. The source of optical excitement can be a laser diode, also contained within the read/write head structure, or a laser source that is external to the read/write head structure, either of which directs its beam at the antenna through a means such as an optical waveguide (WG). As a result of the WG, the optical mode of the incident radiation couples to a plasmon mode in the PA, whereby the optical energy is converted into plasmon energy. This plasmon energy is then focused by the PA onto the medium at which point the heating occurs. When the heated spot on the medium is correctly aligned with the magnetic field produced by the write head pole, TAMR is achieved.

K. Tanaka et al. (US Publ. Pat. App. US2008/0192376) and K. Shimazawa et al. (US Publ. Pat. App. US2008/0198496) both describe TAMR structures that utilize edge plasmon mode coupling.

Rochelle, (U.S. Pat. No. 6,538,617) describes an antenna for sensing magnetic fields that employs a ferrite magnetic core.

Burdick et al. (U.S. Pat. No. 6,424,820) teaches a short wave antenna comprising wire wrapped around a ferrite core.

None of these prior arts address the issues to be dealt with by the present invention.

Referring first to FIG. 1, there is shown a schematic illustration of an exemplary prior art TAMR structure in an ABS (shown as a dashed line) view and in a side cross-sectional view. The dimensional directions in the ABS view are indicated as x-y coordinates, with the x coordinate being a cross-track coordinate in the plane of the medium and the y coordinate being a down-track direction. In the cross-sectional view, the x coordinate would emerge from the plane of the drawing and the z coordinate is in the direction towards the ABS of the head.

The conventional magnetic write head includes a main magnetic pole (MP) (1), which is shown with a rectangular ABS shape, a writer coil (5) (three winding cross-sections drawn) for inducing a magnetic field within the pole structure and a return pole (3). Generally, magnetic flux emerges from the main magnetic pole, passes through the magnetic media and returns through the return pole.

The optical waveguide (WG) (4) guides optical frequency electromagnetic radiation (6) towards the air bearing surface (ABS) (10) of the write head. The ABS end of the write head will be denoted its distal end. The plasmon antenna (PA) (2), which has a triangular shape in the ABS plane, extends distally to the ABS. The distal end of the waveguide (4) terminates at a depth, d, away from the ABS. An optical frequency mode (6) of the electromagnetic radiation couples to the edge plasmon mode (7) of the PA (2) and energy from the edge plasmon mode is then transmitted to the media surface where it heats the surface locally at the ABS edge of the PA triangle.

An advantage of the design illustrated in this figure is that the WG (4) terminates before reaching the ABS of the write head so that leakage of visible radiation to the ABS is reduced. Meanwhile, the energy from the edge plasmon mode (7), upon reaching the ABS, can achieve a spatially confined region that is desirable for achieving a high thermal gradient in the magnetic medium. With the long PA body (2) and large volume of metal composing the PA, heating damage of the PA is also greatly reduced.

In the prior art cited above, the materials used to form the PA are metals like Ag and Au that are known to be excellent in generating optically driven plasmon modes. However, in the prior art a problem still exists in aligning the optical heating profile within the region of energy transfer at the medium surface, with the magnetic field profile generated by the write head.

Referring to FIG. 2, there are shown schematically a typical prior art magnetic field profile (8) and below it, a heating profile (9), such as would be produced by the TAMR writer of FIG. 1 at the position of the heating spot (the peak of the profile) on the magnetic medium. The horizontal coordinate axis in both graphs is the y-coordinate of FIG. 1. The vertical axis is the magnetic field, $H_z$, in the magnetic field profile and the heat intensity, $P_{heat}$, in the heating profile. Both profiles are localized within a small region of the magnetic medium. For reference purposes, the ABS shape of the PA (2) and the ABS shape of the MP (1) (also shown in FIG. 1) are drawn below the axes, so the location of the field and heat transfer can be ascertained.

As can be seen in FIG. 2, the heating spot is at the far leading edge of the magnetic field profile produced by the MP. Although this location will allow sufficient writing resolution with enough heating, it is not the optimal positioning of the two curves relative to each other. To obtain the full benefit of TAMR, the slope of the heating profile (9) should be aligned with the encircled regions of maximum slope (10) or (11), of the magnetic field profile. In this case, a multiplicative factor of the two maximum gradients is obtained.

Due to structural limitations, caused, for example, by the thickness and arrangement of the WG and by choice of the PA design, difficulties in alignments during fabrication, etc., optimal alignment of the heating and field profiles cannot be obtained.

SUMMARY OF THE INVENTION

It is a first object of the present invention to produce a new TAMR antenna structure in which the simultaneous application of magnetic field and heat to a heating spot on a magnetic medium is optimized to produce a greater effective recording field gradient.

It is a second object of this invention to achieve higher recording density on magnetic recording media by means of the improved TAMR scheme that utilizes the optimal positioning of the magnetic recording field and the thermal energy for heating the medium.

It is a third object of this invention to produce a higher magnetic field at the heating spot in TAMR along with the maximum field gradient.

It is a fourth object of this invention to achieve self-alignment of the magnetic field and thermal power gradients at the heating spot.

It is a fifth object of the present invention to produce an improved plasmon antenna.

It is a sixth object of the present invention to achieve the previous objects without resorting to a significant variation in present fabrication technologies.

These objects will be achieved by means of a plasmon antenna design in which there is a core of magnetic material, such as CoFe or NiFe, overcoated with a non-magnetic highly conductive metal, such as Au or Ag. This proposed antenna composition, with its central magnetic core and with edge plasmon mode excitation resulting from radiative coupling to an optical waveguide substantially confined to the overcoat, will self align the magnetic field gradient with a thermal heating gradient produced by the plasmon mode during magnetic recording. This self-alignment, in which maximum thermal gradients and maximum magnetic field gradients are aligned, will enhance the effective recording field gradient and achieve higher recording density. The fabrication method is easily adaptable to existing head fabrication techniques. By attaching the antenna directly to the writer pole, as in one of the preferred embodiments, the fabrication method can be further simplified and an additional benefit of lower antenna temperature during operation can be achieved.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic drawing of a prior art TAMR design,

FIG. 2 is a schematic graphical representation of the magnetic field profile and heating profile of the prior art design of FIG. 1

FIGS. 3a and 3b are schematic illustrations showing front (3a) and perspective views (3b) of an antenna/waveguide design of the present invention.

FIG. 4 is a schematic illustration showing the positioning of the plasmon antenna, waveguide and magnetic write pole of an embodiment of the present invention.

FIG. 5 is a graphical illustration showing the difference in magnetic field and heating profile alignments for a prior art antenna and for the antenna of the present invention.

FIGS. 11a and b, are schematic illustrations of a fourth embodiment of the present invention showing a configuration of the antenna/waveguide/write pole.

DESCRIPTION OF THE PREFERRED EMBODIMENTS

Figures 6, 7:
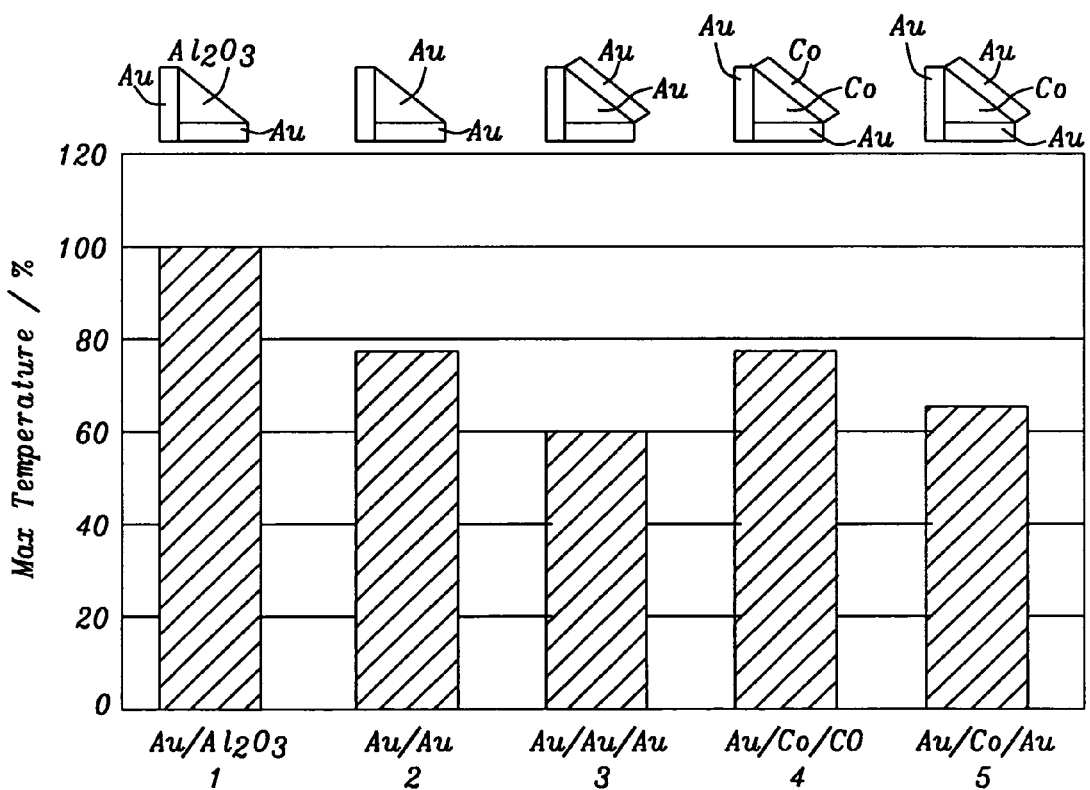
FIG. 6 is a tabulation of the efficiency of the coupling between the optical waveguide mode and the edge plasmon mode for different plasmon antenna compositions.
FIG. 7 is a schematic graphical indication of the heating of the antenna of the present invention as a function of different cladding materials and in comparison with prior art type antennas.

The preferred embodiment of this invention is a TAMR write head for producing high density recording on a magnetic medium. The write head incorporates a plasmon antenna of novel structure that is attached to the write head so that a face of the antenna emerges at the ABS of the writer at a position adjacent to the ABS of the main magnetic pole. The plasmon antenna is radiatively coupled to optical frequency electromagnetic radiation generated preferably by an optical laser and guided by an optical waveguide to the plasmon antenna. The radiative coupling generates edge plasmon modes within the antenna whose associated electromagnetic fields impinge on a small surface area of the magnetic medium generating thermal energy with a spatially dependent profile within that area and causing the temperature of that area to increase. The magnetic pole of the writer produces a magnetic writing field, with a spatially dependent field intensity profile that impinges on a surface area that overlaps with the plasmon field. The spatial alignment of the thermal energy distribution and the magnetic field is such that there is substantial overlap at their regions of maximum gradient. This overlap increases the effectiveness of the magnetic field in changing the local magnetization of the magnetic medium so that magnetic writing on the medium is greatly enhanced and can be confined to extremely small surface areas.

Referring to FIG. 3a, there is shown a schematic illustration of a front view (looking up at the ABS) of a portion of a simplified version of an embodiment of the invention, showing the ABS of the plasmon antenna (22) and the distal face (recessed from the ABS) of the adjacent optical waveguide (23). The plasmon antenna (22) has a core (24) formed of magnetic material, partially surrounded by a layer (27) (shown shaded for clarity) of a non-magnetic highly conductive metal (such as Au or Ag). The antenna is formed in the shape of an elongated prism, here shown as a prism with an isosceles or equilateral triangular cross-section.

Referring to FIG. 3b, there is shown a schematic perspective view of the same system as in FIG. 3a. The position of the antenna (22) with its vertex just above a face of the waveguide (23) promotes coupling of the edge plasmon (7), which is substantially confined to the vertex region of the conductive coating (27), to the electromagnetic optical mode (6) within the waveguide. The magnetic core (24) of the plasmon antenna serves to channel the magnetic flux of the main writer pole (not shown in this figure) so that it will align optimally with the thermal energy profile produced by the plasmon field within the magnetic medium.

Referring to FIG. 4, there is shown a schematic illustration of a side cross-sectional view of the main pole (21) of a magnetic writer to which is affixed (or adjacently mounted) the magnetic core plasmon antenna (22) (MCA) of the present invention. The MCA (22) and main pole (MP) (21) share a common ABS (shown as a dashed line). A waveguide (WG) (23) is mounted adjacent to the antenna, MCA (22), and recessed vertically relative to the ABS. A schematic illustration of the ABS face of the MCA is shown encircled with a dashed line, to indicate the magnetic core (24), such as a core of FeCo or NiFe, partially overcoated with a layer (27) of Au (shown shaded for emphasis). In this configuration the flat face of the MCA, which is opposite the vertex and not covered by the overcoat (27), is parallel to the trailing edge of the MP, while the vertex of the MCA, which supports the edge plasmon mode, faces away from the trailing edge of the MP and is immediately adjacent to the WG (23). The WG is downtrack of the MCA and its distal end is vertically above the ABS. Dashed arrows from WG (23) to MCA (22) indicate the coupling of radiation from WG to the MCA. Arrows indicate the magnetic field emanating from both the pole, MP, (21) and antenna (22) and plasmon energy being emitted from the antenna as well. Of course the magnetic field from the antenna is emitted by its core (24), and the plasmon energy is emitted from its overcoat (27).

During recording, the magnetic field produced by the MP (21) magnetizes the core of the MCA (24) and can even saturate the core if the spacing is small, literally zero spacing being quite appropriate. Thus, the magnetic core of the antenna can be considered a part of the MP structure rather than the MCA structure, in that its role is to direct magnetic flux to the spot on the medium being heated rather than contribute to the heat generating properties of the edge plasmon mode.

Referring to FIG. 5, there is shown a graphical simulation of the magnetic field distribution of the pole (21) of FIG. 4, with two curve segments showing the distribution in both the presence (20) (solid line) and absence (25) (dashed line) of the MCA. In the simulation, the absent MCA actually corresponds to a plasmon antenna of pure Au, with no magnetic core. The horizontal axis of the graph indicates microns of distance downtrack from the center of the pole. The spot on the medium being heated is approximately 0.35 microns downtrack of the pole center. As can be seen, the magnetic field intensity distribution is essentially constant across the width of the pole, which lies between −0.3 and +0.2 microns. In the absence of the MCA (dashed line (25)), the magnetic field intensity decays sharply beyond the lateral dimensions of the pole. In the presence of the MCA (solid line (20)), the magnetic field intensity rises and peaks at approximately the trailing edge of the MCA then has a sharp gradient at approximately 0.35 microns, where the spot being heated is located. This indicates that the steepest gradient of the magnetic field profile in the presence of the MCA will be properly aligned with the steepest gradient of the heating profile so as to maximize the TAMR effect. Further, the additional peak of the magnetic field in the case of the MCA also raises the magnetic field strength to approximately 10 kOe, compared to the value of approximately 4 kOe in the absence of the MCA. Thus, there is a combination of both optimal gradient alignments and field strength improvements, both of which improve the TAMR effect.

Referring now to FIG. 6, there is shown the tabular results of a simulation to calculate the efficiency with which the optical radiation from the WG couples to edge plasma modes in three plasmon antennas having similar prismatic shapes but different material compositions and configurations. The simulation model allows the calculation of optical-mode coupling efficiencies between the waveguide and the antenna as well as the efficiency with which electromagnetic energy is transferred to the medium as heat energy. Three structural compositions and configurations were simulated: a solid antenna formed entirely of Ag, an antenna with a non-metallic and non-magnetic core of alumina ($Al_2O_3$) partially clad with a layer of Ag and an antenna like that of a preferred embodiment, namely having a magnetic core of NiFe partially clad by a layer of Au. The simulations show that the edge plasmon mode is quite efficiently generated in the antenna with the NiFe core that is clad with Ag. In fact, the coupling efficiency and power transfer efficiency are quite close to that of the solid Ag antenna and much better than the Ag clad antenna with the alumina core. It is to be emphasized that the input optical modes used in this simulation were optimized for coupling to the solid Ag antenna, not the clad antenna. Therefore it is reasonable to suppose that the clad antenna can produce more efficient coupling when the input modes and antenna structure are optimized.

In addition to the magnetic field advantages produced by the magnetic core antenna of the present invention, there is also a heat sink effect produced by the large metal volume that maintains a low temperature of the antenna. When the medium is heated by the plasmon edge mode at the antenna tip, the antenna itself also heats up. Theoretically, the larger the antenna metal volume, the lower will be the antenna temperature resulting from heating the medium.

Referring to FIG. 7, there is shown the results of five simulations with the following metal antenna structures. Sketches above the histograms provide a schematic indication of the configuration.

1. Au/Al$_2$O$_3$: an alumina core partially clad with Au
2. Au/Au: essentially solid Au
3. Au/Au/Au: an Au antenna with an additional layer of Au on the flat side
4. Au/Co/Co: Au cladding, Co core and additional layer of Co on the flat side
5. Au/Co/Au: Au cladding, Co core and additional layer of Au The additional layers are formed on the face opposite the vertex that supports the edge plasmon mode. Such a layer simulates the additional heat sink effect from a metal backing, for example from a magnetic writer pole as in case 4.

The five maximum temperature values are normalized to percentages of the first configuration. The thermal conductivities have been taken to be 317 W/mK for Au, 2 W/mK for alumina and 93 W/mK for the Co. The core material plays a determining factor in the final maximum temperature of the antenna, with the Au core having the lowest temperature and the alumina core having the highest. The addition a metal layer to the back side of the antenna, opposite to the vertex that supports the plasmon mode, acts as a heat sink (as noted above) and helps to reduce the antenna maximum temperature. Because the magnetic core of the antenna shifts the position of the magnetic writing field, it can be attached directly to the main pole of the write head, thereby using that large metallic element as an additional heat sink. For a prior art antenna with no magnetic core such direct attachment to the main pole may not be as advantageous or beneficial.

Embodiment 1

Figure 8A:
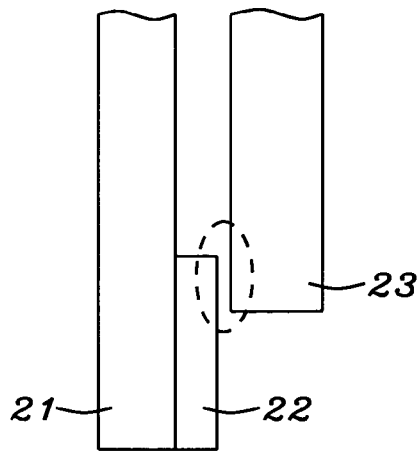
FIGS. 8a, b, c, d, e, f and g are schematic illustrations of a first embodiment of the present invention showing a first configuration of the antenna/waveguide/write pole as well as steps in a fabrication process to make the invention.

Referring to schematic FIG. 8a, there is shown a side view of a first embodiment of a TAMR head that has a magnetic write pole (21), a plasmon antenna (22) and an optical waveguide (23). The magnetic pole generates a magnetic field to switch the magnetizations of medium grains during the recording process. The plasmon antenna (22) transmits electromagnetic energy from an edge plasmon mode to the medium. The plasmon mode is, in turn, generated by optical radiation within the waveguide (23) that couples to the plasmon generating layer ((27) in FIG. 8b) of the plasmon antenna. The electromagnetic energy of the plasmon mode produces localized heating of the medium through absorption of electric field energy from the plasmon mode by the medium. The heating reduces medium anisotropy and coercivity to enable an easier switching by the magnetic field emanating from (21) and from (22).

More specifically, the waveguide (23) transmits an externally generated optical frequency electromagnetic wave into the TAMR head (typically generated by a solid state optical laser mounted externally to the head but adjacent to the head) and couples the optical mode to the plasmon mode in the antenna. The coupling occurs in the encircled region of overlap between the waveguide (23) and the antenna (22). Note it is not the intent of these embodiments to teach the methods by which an optical waveguide or laser is fabricated.

Figure 8B:
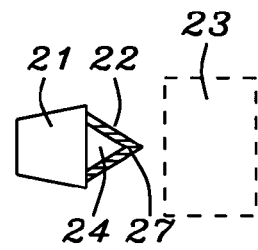

Referring now to schematic FIG. 8b, there is shown a horizontal (looking up from the ABS plane) view of a plasmon antenna (22) that is formed together with and integral with the writer magnetic pole (21) by means of direct deposition of a plasmon generating non-magnetic metallic layer (27) over a pre-patterned tapered, triangular prismatic structure (24) formed on the pole (21). Note that, for simplicity of fabrication and for illustration purposes, the magnetic pole (21) is disclosed and pictured hereinafter as a solid prism with a horizontal cross-sectional shape of a trapezoid, resembling a truncated isosceles triangle. The wider of the parallel faces of the trapezoid is proximal to the waveguide and contacts the plasmon antenna (22). Note that the conductive metallic layer (27) is shown here as only covering the tapered core portion (24), but it can equally well extend to the outer edges of the pole (21) as will be shown with reference to FIG. 8g.

Figure 8C:
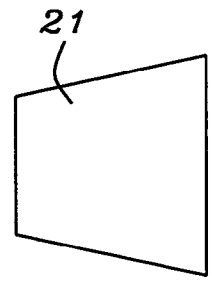
Figure 8D:
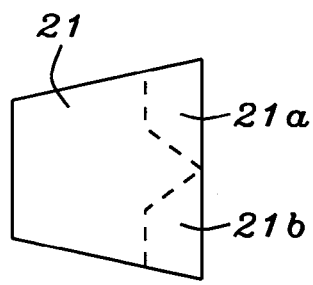
Figure 8E:
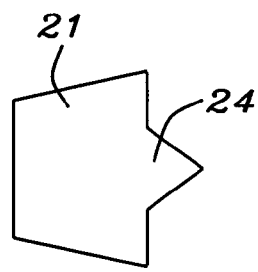
Figure 8F:
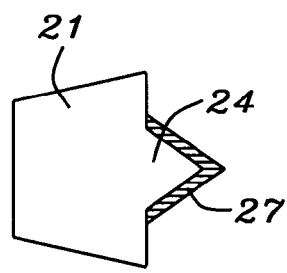
Figure 8G:
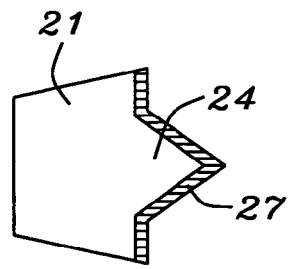

Referring to FIG. 8c, there is shown the first of a sequence of steps by which the plasmon antenna of FIG. 8a may be fabricated and positioned relative to the magnetic pole (21). In C, there is shown an ABS view of the magnetic pole (21). In FIG. 8d, there is shown the same structure as in FIG. 8c, but two laterally disposed regions (21a) and (21b) have been designated for removal by an etching (such as an IBE) process. This etching process will extend upward, away from the distal ABS end of the pole, until the proper length of the antenna is achieved. Referring to FIG. 8e, there is shown the ABS view with portions (21a) and (21b) removed. The triangular projection (24) formed by the material removal will form the magnetic core of the plasmon antenna. Finally, in FIG. 8f, there is shown a conducting layer (27), which forms the plasmon generating layer, deposited on the core (24), to complete the plasmon antenna structure. Note, also, that as shown in FIG. 8g, the plasmon generating layer (27) can extend beyond the sides of the core (24) and cover laterally disposed sides of the magnetic pole (21).

The plasmon generating layer (27) can be a layer of material chosen from the group of highly conductive metals, such as Au or Ag, and formed to a thickness of approximately tens of nanometers. The resulting tapered portion of the magnetic pole (24), which comprises a magnetic material used to form a magnetic pole such as single or composites of the following materials Fe, Co, Ni, B, when covered with the metallic, conducting, plasmon generating layer (27) of Au or Ag, together forms the plasmon antenna of the present invention. This layer (27) is preferably between approximately 10 and 100 nm in thickness.

In this and the following embodiments, the combination of magnetic core and metallic overlayer is called the plasmon antenna and it will hereinafter be labeled (22). Note that in this particular embodiment and in the embodiments to follow, the plasmon antenna will be preferably shaped as a triangular prism of substantially isosceles triangular cross-sectional shape. The two sides (or faces) of the prism corresponding to the isosceles legs of the triangle will be covered by the conducting layer as will the vertex of the prism formed by the meeting of these two sides. The base of the prism is substantially free of the conducting overlayer, except where the edges of the overlayer are exposed alongside the edges of the triangular base. The prism is formed longitudinally along the side of the magnetic pole, extending in the direction towards the ABS of the writer.

The tapered edge (i.e., the vertex) of the prism points towards the trailing direction of the TAMR head and directly faces the optical waveguide (23) which is positioned further down-track of the antenna and is separated from the antenna by a space. Preferably the spacing between the vertex of the antenna and the face of the waveguide can be between approximately 0 nm (physical contact) and 100 nm (nm=nanometers=$10^{-9}$ meters). The length of the plasmon antenna in the direction towards the ABS is between approximately 200 and 5000 nm and the height of the triangular cross-sectional base (base edge to vertex) is between approximately 25 and 500 nm. The width of the base (side opposite the vertex) is between approximately 50 and 1000 nm. Note that these dimensions are characteristic of the plasmon antenna in all embodiments.

The writer pole and the antenna are exposed at the ABS of the TAMR head, while the distal end of the waveguide (i.e., the end closest to the ABS) is recessed by a distance, d, preferably greater than approximately 0.2 microns from the ABS to reduce optical leakage. If light coupling to the antenna is efficient, however, the distal surface of the antenna can be at the ABS. The etched portion of the pole (22) over which the conducting plasmon layer (27) is deposited forms the magnetic core of the antenna, thereby achieving the objects of the present invention. The tapering end of the antenna can be flat (see, for example, FIG. 12g) or rounded to produce stronger magnetic field gradient, or it can be sharp, to increase energy focusing. For purposes of transferring radiation between the waveguide and the plasmon antenna, the non-magnetic separation layer between the waveguide and antenna can be formed of a dielectric material having a low index of refraction. Materials such as $Al_2O_3$, with an index n approximately 1.65, $SiO_2$ with an index n approximately 1.46 or $MgF_2$ with an index n approximately 1.2 are suitable as separation media in this application.

Embodiment 2

Figure 9A:
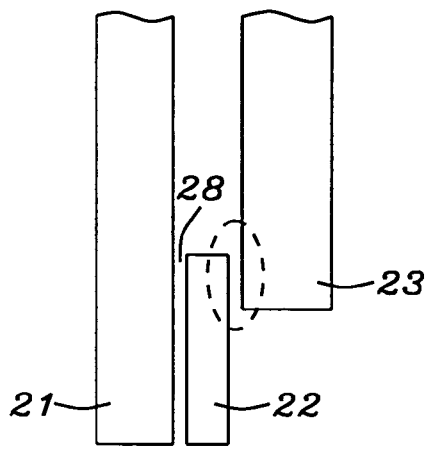
FIGS. 9a, b, c and d are schematic illustrations of a second embodiment of the present invention showing a configuration of the antenna/waveguide/write pole and a method to fabricate it.
Figure 9B:
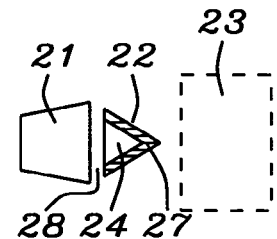

Referring to FIG. 9a, there is shown a schematic side view of a second embodiment of the plasmon antenna of the present invention which is similar to the first embodiment except that the plasmon antenna (22) is neither physically a part of nor is it directly attached to the writer magnetic pole (21). Instead, a non-magnetic separation layer (28) (shown as a space), metallic or non-metallic, separates the base of the antenna and the trailing edge surface of the write pole. Referring to schematic FIG. 9b, there is shown a horizontal cross-sectional view looking up at the ABS of the structure of FIG. 9a from the medium surface, showing the same elements. The distal surface of the waveguide (23) is shown as dashed, to indicate that it is recessed from the ABS, The plasmon antenna (22) is shown with its core (24) and plasmon generating layer (27) visible.

Figure 9C:
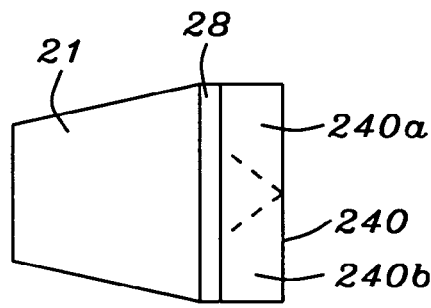

As is shown in FIG. 9c, the first step in fabricating the structure of FIG. 9a, is the deposition of a magnetic core layer (240) of the plasmon antenna on the separation layer (28) and defining regions to be removed by etching (240a), (240b). As shown in FIG. 9c, these two regions are then removed to form the tapered shape over which the plasmon generation metallic layer (27) is then formed. As already noted, the write field generated by the magnetic pole (21) magnetizes the magnetic core (24), while the waveguide (23) couples to a plasmon mode within the metallic layer (27).

Embodiment 3

Figure 10A:
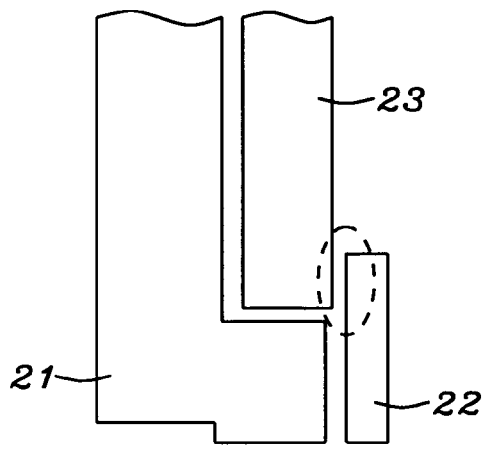
FIGS. 10a, b, c, d, e, f and g are schematic illustrations of a third embodiment of the present invention showing an "L" shaped configuration of the antenna/waveguide/write pole.

Referring to schematic FIG. 10a, there is shown a side view of a third embodiment of the plasmon antenna (22) which functions in generally the same manner as the first two embodiments. In this embodiment, however, the waveguide (23) positioned partially between the write pole (21) and the antenna (22). The write pole (21) is, therefore, given an L shape to accommodate the placement of the waveguide (23). The ABS of the pole is shown with a slight extension.

Figure 10B:
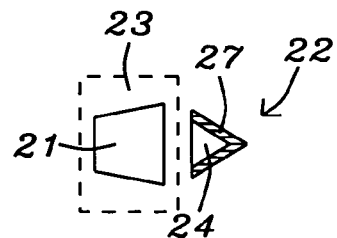

Referring to FIG. 10b, there is shown a horizontal cross-sectional view of the same configuration from an upward facing perspective. The outline of the waveguide (23) is dashed, to indicate that it is not in the same plane as the other features. The entire L shaped base of the pole is not fully illustrated.

Because of the positioning of the waveguide relative to the antenna, the coupling of the optical mode to the plasmon mode will be through the exposed edges of the metallic layer (27), rather than at the vertex of the metallic layer. To reduce the distance between the write pole (21) and the antenna (22), and to enhance the effects of the magnetic field of the write pole on the magnetic core (24) of the antenna, the writer pole is formed with an "L" shape, as shown in the drawing, with the short leg of the "L" passing beneath the distal end of the waveguide. Because of the unuasual shape of the pole, a method of its formation will be given in the following.

Referring to schematic FIG. 10c, there is shown schematically the first step in a method of fabricating the "L" shaped write pole. According to this method, there is first formed a main write pole layer (211a). A layer of photoresist (29) is formed partially covering a surface of (211a) as shown.

Referring to schematic FIG. 10d, there is shown the fabrication of FIG. 10c with an auxiliary magnetic piece (211b) plated over the portion of the pole layer not covered by the photoresist, so as to extend out and to partially overcoat the photoresist (29).

Referring now to schematic FIG. 10e, there is shown the fabrication of FIG. 10d where a step of CMP polishes away the overcoat, leaving an "L" shaped pole (21), still partially covered by the photoresist (29).

Referring to schematic FIG. 10f, there is shown the fabrication of FIG. 10e with the remaining photoresist removed and a non-magnetic separation layer (28) is deposited over the exposed surface of the pole piece.

Finally, referring to schematic FIG. 10g, there is shown a waveguide (23) formed against the separation layer (28) and a plasmon antenna formed adjacent to the waveguide against another non-magnetic separation layer (25). As was already stated, for purposes of transferring radiation between the waveguide and the plasmon antenna, the non-magnetic separation layer between the waveguide and antenna can be formed of a dielectric material having a low index of refraction. Materials such as $Al_2O_3$, with an index n approximately 1.65, $SiO_2$ with an index n approximately 1.46 or $MgF_2$ with an index n approximately 1.2 are suitable as separation media in this application. The ABS of the pole may be further shaped as in FIG. 10a. The method of forming the waveguide will not be provided herein, since such methods are known in the prior art. The method of forming the plasmon antenna can proceed as in the second embodiment above.

Embodiment 4

Figure 9D:
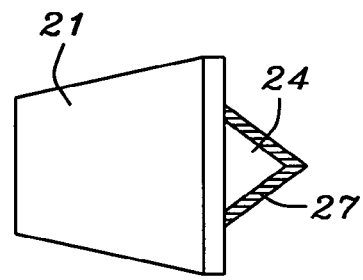

Referring to schematic FIGS. 11a and 11b, it can be seen that the general aspects of the TAMR function are the same as in Embodiment 2 (FIG. 9a). However, in this embodiment the distal end of the waveguide (23) contacts the end of the antenna (22) at an interface (223) farthest from the ABS and does not overlap the length direction of the antenna towards the ABS. Waveguide (23) and antenna (22) can be separated by a non-metallic spacer or they can be in direct physical contact as shown in the figure. The direct contact can be physical contact at the interface (223) as shown, or the antenna can extend into the waveguide for a distance (not shown). The coupling between the optical mode of the waveguide and the plasmon mode of the antenna occurs at the encircled region at the interface (223). The antenna (22) can be fabricated against the side of the magnetic pole (21) by the method shown in FIG. 9c-FIG. 9d.

Embodiment 5

Referring to schematic FIGS. 12a and 12b, it is seen that all aspects of this embodiment are the same as Embodiment 2, except that the antenna (22) tapering direction is towards the leading edge of the magnetic pole (21) of the TAMR head, as can be clearly seen in schematic FIG. 12b. In this configuration the magnetic core (24) of the antenna (22), instead of the conducting overcoat (27) is facing the waveguide (23) trailing edge surface. However, the vertex of the antenna, which now faces the write pole (21), still accomplishes the heating of the medium surface as a result of the plasmon mode established within the overcoat.

Fabrication of this plasmon antenna configuration can be achieved, for example, in accord with the following steps. Referring to schematic FIG. 12c, there is shown a non-magnetic layer (29) formed over a face of the magnetic pole (21) and a layer of dielectric material (33) formed over the non-magnetic layer. A trench (outlined) will be formed within this layer having the shape of the plasmon antenna.

Referring to schematic FIG. 12d there is shown that the trench (35) has been formed and it has been lined with the conducting plasmon layer (27) of Ag or Au.

Figure 12E:
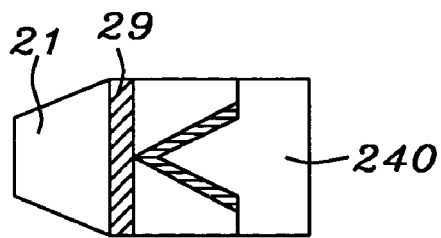
FIGS. 12a, b, c, d, e, f and g are schematic illustrations of a fifth embodiment of the present invention showing a configuration of the antenna/waveguide/write pole and a method for its fabrication.

Referring to schematic FIG. 12e, there is shown the deposition of a layer of magnetic material (240), such as the magnetic material of the pole, filling the trench that is now lined (27) with the plasmon layer.

Figure 12F:
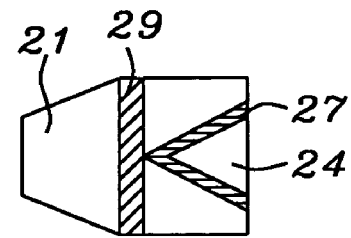

Referring to schematic FIG. 12f, there is shown that a process of chemical mechanical polishing (CMP) has removed the excess magnetic material from layer (240) of FIG. 12e, leaving behind the magnetic core (24) of the plasmon antenna.

Figure 12G:
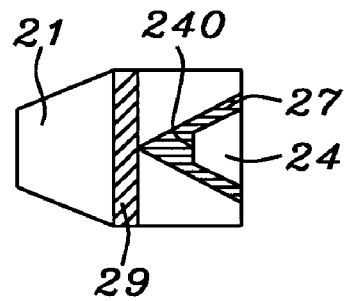

Referring finally to schematic FIG. 12g, there is shown that the magnetic core (24), which now effectively serves as a trailing shield for the magnetic pole (21) during the recording process, can be flattened at its tapering edge (240) to enhance the flux concentration from the writer pole and increase the field gradient between (21) and (24).

Embodiment 6

Figure 13A:
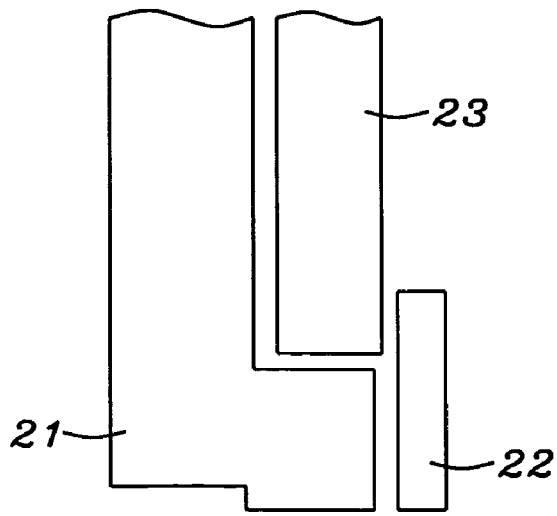
FIGS. 13a and b, are schematic illustrations of a sixth embodiment of the present invention showing a configuration of the antenna/waveguide/write pole.
Figure 13B:
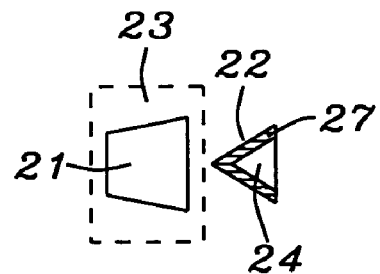

Referring to schematic FIG. 13a and FIG. 13b there is shown a configuration that is the same as that of embodiment 3, except that the antenna (22) is tapered towards the leading edge of the TAMR head. The fabrication steps for this embodiment proceed substantially identically to those in FIG. 10a through FIG. 10g.

Embodiment 7

Figure 14A:
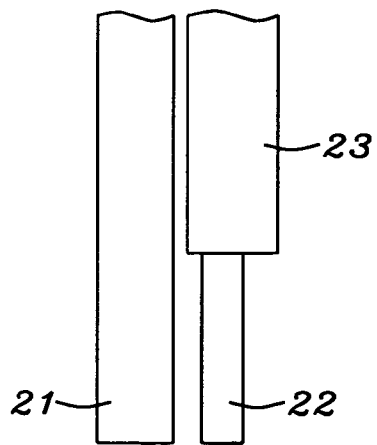
FIGS. 14a and b, are schematic illustrations of a seventh embodiment of the present invention showing a configuration of the antenna/waveguide/write pole.
Figure 14B:
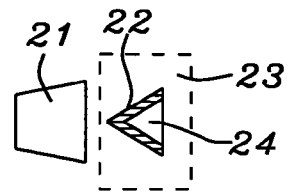

Referring to schematic FIG. 14a, and FIG. 14b, there is shown a configuration that is the same as that of embodiment 4, except that the antenna (22) is tapered towards the leading edge of the TAMR head.

Embodiment 8

Figure 15A:
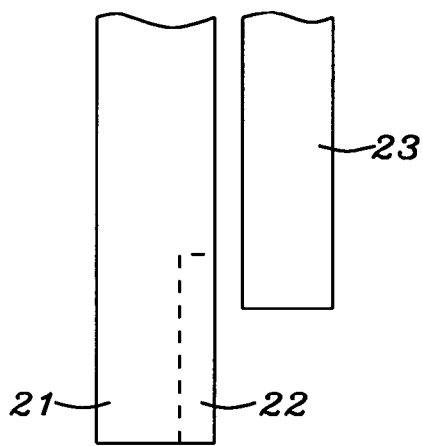
FIGS. 15a, b, c, d, e and f are schematic illustrations of an eighth embodiment of the present invention showing a configuration of the antenna/waveguide/write pole and a method for its fabrication.
Figure 15B:
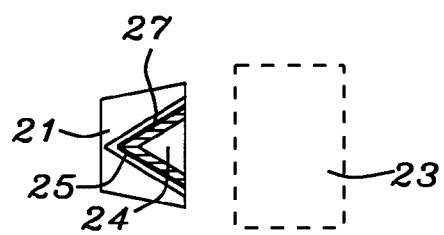

Referring to schematic FIG. 15a and FIG. 15b, there is shown a configuration that is the same as that of embodiment 1, except that the antenna (22) is formed by etching a cavity within the main pole (21), followed by the deposition of an isolating non-metallic seed layer (25) over which is formed a metallic plasmon layer (27). The magnetic core (24) is then deposited within this lined cavity.

Figure 15C:
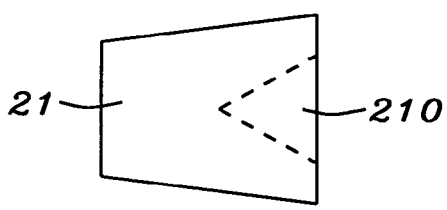

Referring to schematic FIG. 15c, there is shown the first of a sequence of steps by which this embodiment can be fabricated. The ABS of the write pole (21) is shown. A region, (210) is delineated within the write pole for removal by a method such as IBE.

Figure 15D:
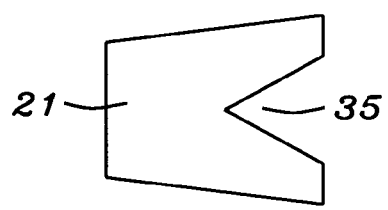

Referring to schematic FIG. 15d, there is shown the write pole with region (210) removed to form a prismatic trench (35) running lengthwise up the write pole from its ABS surface to a distance corresponding to a desired length of the antenna.

Figure 15E:
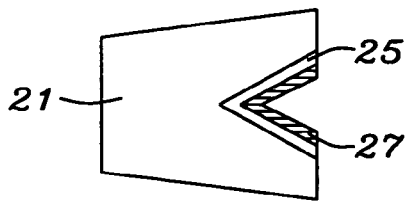

Referring now to schematic FIG. 15e, there is shown the trench lined with a bilayer comprising a first layer (25) that is an isolating seed layer, over which is formed a conducting layer (27), such as a layer of Ag or Au formed to a thickness of several tens of nanometers, within which the plasmon mode will be formed.

Figure 15F:
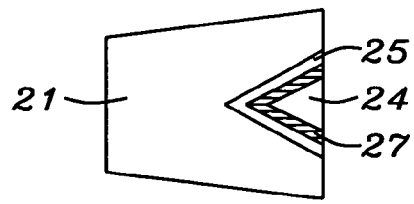

Referring finally to schematic FIG. 15f, there is shown the deposition of a magnetic core, (24), such as a core of NiFe or FeCo within the lined trench.

As is understood by a person skilled in the art, the preferred embodiments of the present invention are illustrative of the present invention rather than being limiting of the present invention. Revisions and modifications may be made to methods, processes, materials, structures, and dimensions through which is formed and used a TAMR write head with a plasmon antenna that provides an optimal overlap of magnetic field gradients and thermal energy transfer gradients on a magnetic recording medium while still providing such a TAMR write head, formed and used in accord with the present invention as defined by the appended claims.

What is claimed is:

1. A TAMR head comprising:
    a magnetic write pole which, when energized, produces a magnetic field for writing on a magnetic recording medium;
    a source of electromagnetic radiation in the optical frequency range;
    an optical waveguide for directing said electromagnetic radiation to a plasmon antenna, wherein said optical waveguide couples said electromagnetic radiation to a plasmon mode generated within said antenna;
    the plasmon antenna for generating and maintaining said plasmon mode within a plasmon generating layer and transferring energy generated by said plasmon mode to a localized region of said magnetic recording medium, thereby heating said localized region and reducing its magnetic coercivity and anisotropy; and wherein
    said plasmon antenna includes a magnetic portion for directing said magnetic field onto said localized region, whereby the strength and gradient of said magnetic field within said localized region, combined with the thermal energy profile of said transferred plasmon mode thermal energy creates optimal conditions for writing within said region of reduced magnetic coercivity and anisotropy.

2. The device of claim 1 wherein said plasmon antenna is fabricated as a solid core of magnetic material over which is formed a plasmon generating layer of conducting material.

3. The device of claim 2 wherein said magnetic material is FeCo, NiFe or Fe, Co, or B singly or in composites and wherein said conducting material is Au or Ag.

4. The device of claim 2 wherein the solid core of said plasmon antenna is formed as a solid prism of substantially isosceles triangular cross-section and wherein said layer of plasmon generating conducting material contiguously covers the vertex of said prism and covers the two prismatic faces defined by the equal length sides of said triangular cross-section that meet to form said vertex and wherein a base of said triangular prism that is opposite to said vertex is substantially uncovered by said layer of conducting material.

5. The device of claim 4 wherein said vertex is flattened or rounded.

6. The device of claim 4 wherein the sides of said isosceles triangular cross-section are between approximately 50 and 1000 nm in length.

7. The device of claim 2 wherein said conducting layer is between approximately 10 and 100 nm in thickness.

8. The device of claim 2 wherein said plasmon antenna is between approximately 200 and 5000 nm in length.

9. The device of claim 4 wherein said plasmon mode is an edge plasmon mode that is formed substantially within a region of said layer of conducting material immediately surrounding and including said vertex of said prism.

10. The device of claim 4 wherein said plasmon antenna is positioned between said waveguide and said magnetic pole and wherein said vertex of said plasmon antenna is positioned immediately adjacent to said waveguide and wherein the base of said prism is aligned parallel to a side of said magnetic pole.

11. The device of claim 4 wherein said plasmon antenna is positioned between said waveguide and said magnetic pole and wherein said vertex of said plasmon antenna is positioned adjacent to said magnetic pole and wherein the base of said prism is adjacent to said waveguide and aligned parallel to a side of said magnetic pole.

12. The device of claim 11 wherein said vertex is positioned between approximately 0 and 100 nm from said magnetic pole.

13. The device of claim 10 wherein said plasmon antenna and said magnetic pole terminate at an ABS plane of said TAMR and wherein a distal end of said waveguide terminates above said ABS plane.

14. The device of claim 11 wherein said plasmon antenna and said magnetic pole terminate at an ABS plane of said TAMR and wherein a distal end of said waveguide terminates above said ABS plane.

15. The device of claim 10 wherein said face of prism is physically attached to said magnetic pole.

16. The device of claim 10 wherein a layer of non-magnetic material is formed on said magnetic pole and wherein said face of said prism opposite said vertex physically contacts said layer of non-magnetic material and is affixed thereto, whereby said plasmon antenna is separated from said magnetic pole.

17. The device of claim 4 wherein said magnetic core of said plasmon antenna is fabricated as an integral part of said magnetic pole by etching away symmetric portions of a side of said magnetic pole to leave a triangular prismatic portion extending therefrom, wherein said magnetic pole and said magnetic core terminate at a common ABS plane, wherein a vertex of said triangular prism is parallel to said side and wherein a layer of conductive material is formed congruently with said magnetic core to form a plasmon antenna that is an integral part of said magnetic pole.

18. The device of claim 17 wherein said optical waveguide is positioned opposite to said vertex and separated therefrom, but wherein electromagnetic radiation from said waveguide impinges on at least a portion of said plasmon antenna and wherein the distal end of said optical waveguide is a distance above said ABS.

19. The device of claim 4 wherein a first side of said optical waveguide is positioned immediately adjacent to a side portion of said write pole but is not in contact with said side portion of said write pole and wherein a second side of said optical waveguide that is opposite said first side of said optical waveguide, is positioned adjacent to the base of said plasmon antenna that is opposite to a vertex of said plasmon antenna whereby electromagnetic radiation from said waveguide impinges on said plasmon antenna and wherein a portion of said write pole that extends beyond the distal end of said waveguide extends laterally past the side of said pole and partially beneath said distal end.

20. The device of claim 4 wherein a first side of said optical waveguide is positioned immediately adjacent to a side portion of said write pole but is not in contact with said side portion of said write pole and wherein a second side of said optical waveguide that is opposite said first side of said optical waveguide, is positioned adjacent to the vertex of said plasmon antenna and wherein a portion of said write pole that extends beyond the distal end of said waveguide extends laterally past the side of said pole and partially beneath said distal end whereby the write pole forms an L shape.

21. The device of claim 4 wherein a first side of said optical waveguide is positioned immediately adjacent to a side portion of said write pole but is not in contact with said side portion of said write pole and wherein a second side of said optical waveguide that is opposite said first side of said optical waveguide, is positioned adjacent to the base of said plasmon antenna and wherein a portion of said write pole that extends beyond the distal end of said waveguide extends laterally past the side of said pole and partially beneath said distal end whereby the write pole forms an L shape.

22. The device of claim 4 wherein said plasmon antenna extends from the distal end of said waveguide to said ABS and wherein said plasmon antenna is positioned with its vertex adjacent to said magnetic pole and wherein the base of said prism is parallel to a side of said magnetic pole.

23. The device of claim 1 wherein said magnetic core of said plasmon antenna is fabricated within a trench formed within said magnetic pole, wherein said trench is shaped as an inverted triangular prism whose vertex forms the deepest part of the trench and wherein said trench is lined conformally and contiguously with a bilayer comprising a first non-metallic isolating seed layer on which is formed a plasmon generating conducting layer of Au or Ag and wherein a core of the magnetic material FeCo or FeNi is then deposited within the lined trench and wherein said optical waveguide is thereby adjacent to a base surface of said core.

24. The device of claim 23 wherein electromagnetic radiation in said waveguide couples to a plasmon mode in said plasmon antenna through edge surfaces of said plasmon generating conducting layer exposed along said base surface.

25. The device of claim 1 wherein said electromagnetic radiation is produced by an optical frequency laser.

* * * * *